(12) United States Patent
Bayerl et al.

(10) Patent No.: US 7,789,589 B2
(45) Date of Patent: Sep. 7, 2010

(54) FASTENING ELEMENT

(75) Inventors: Michael Bayerl, Tuerkheim (DE);
Wolfgang Ludwig, Zaisertshofen (DE);
Kay Heemann, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/286,011

(22) Filed: Sep. 26, 2008

(65) Prior Publication Data
US 2009/0092446 A1    Apr. 9, 2009

(30) Foreign Application Priority Data
Oct. 8, 2007    (DE) .................. 10 2007 000 829

(51) Int. Cl.
*E21D 21/00* (2006.01)
(52) U.S. Cl. .................. 405/259.5; 411/397
(58) Field of Classification Search .......... 405/259.5, 405/259.6, 259.1; 411/930, 82, 82.1, 82.2, 411/82.3, 178, 383, 384, 397
See application file for complete search history.

(56) References Cited
U.S. PATENT DOCUMENTS

| | | | | |
|---|---|---|---|---|
| 3,270,469 A * | 9/1966 | Debiton | ...... | 52/2.26 |
| 3,359,742 A * | 12/1967 | Blatter | ...... | 405/259.5 |
| 3,494,134 A * | 2/1970 | Gabriel | ...... | 405/259.5 |
| 3,735,541 A * | 5/1973 | Vanderlinde | ...... | 52/98 |
| 3,855,804 A * | 12/1974 | Herbst et al. | ...... | 405/237 |
| 3,946,570 A * | 3/1976 | Freydier | ...... | 405/239 |
| 6,457,910 B1 * | 10/2002 | Ludwig et al. | ...... | 405/259.1 |
| 6,468,010 B2 * | 10/2002 | Sager et al. | ...... | 411/82 |
| 6,491,478 B2 * | 12/2002 | Sager et al. | ...... | 405/259.6 |
| 7,025,538 B2 * | 4/2006 | Ludwig et al. | ...... | 405/259.5 |
| 7,033,117 B2 * | 4/2006 | Ludwig et al. | ...... | 405/259.5 |
| 2001/0028828 A1 * | 10/2001 | Sager et al. | ...... | 405/259.6 |
| 2005/0025578 A1 * | 2/2005 | Ludwig et al. | ...... | 405/259.1 |
| 2005/0047874 A1 * | 3/2005 | Ludwig et al. | ...... | 405/259.1 |
| 2005/0260041 A1 * | 11/2005 | Ludwig et al. | ...... | 405/259.6 |
| 2006/0153645 A1 * | 7/2006 | Rataj et al. | ...... | 405/259.5 |
| 2008/0031695 A1 * | 2/2008 | Nasr | ...... | 405/233 |
| 2008/0193225 A1 * | 8/2008 | Melegari | ...... | 405/275 |

\* cited by examiner

*Primary Examiner*—Tara Mayo-Pinnock
(74) *Attorney, Agent, or Firm*—Abelman, Frayne & Schwab

(57) ABSTRACT

A fastening element has a drilling head (21) provided at one end (16) of anchor tube (12) and having at least one inlet opening (23) that opens toward the receiving chamber (13) of the anchor tube (12), and at least one through-opening (24) that opens outwardly for passing of the hardenable mass therethrough, and a mixing element (31) for the hardenable mass and which is located in the drilling head (21) between the at least one inlet opening (23) and the at least one through-opening (24).

6 Claims, 1 Drawing Sheet

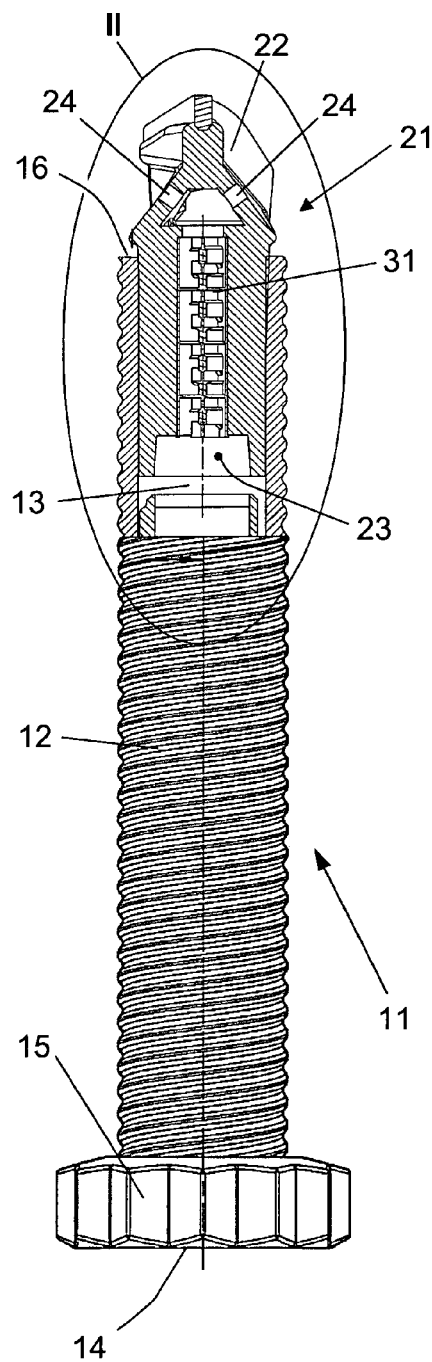
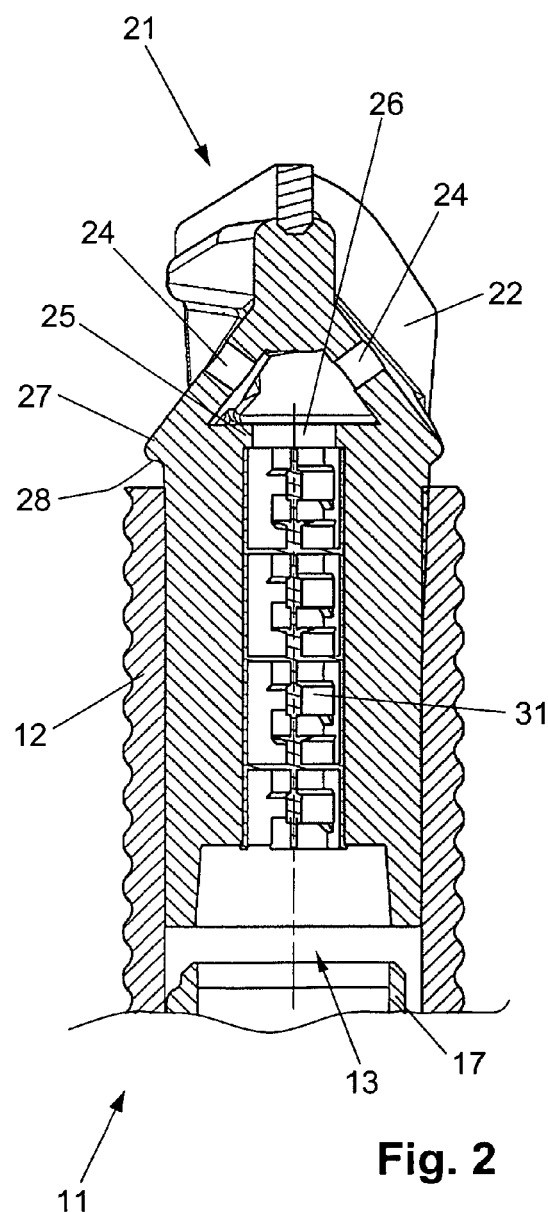
Fig. 1
Fig. 2

FASTENING ELEMENT

BACKGROUND OF THE INVENTION

1. Field of the Invention

The present invention relates to a fastening element including an anchor tube having a receiving chamber for a hardenable mass, and drilling head provided at one end of the anchor tube and having at least one inlet opening that opens toward the receiving chamber of the anchor tube, and at least one through-opening that opens outwardly for passing of the hardenable mass therethrough.

2. Description of the Prior Art

Fastening elements of the type described above are used, e.g., for reinforcement of tunnels and mines. To this end, firstly, a borehole is formed in a tunnel or mine roof, e.g., then the borehole is filled with a hardenable mass and, finally, an anchor element is driven into the borehole filled with the hardenable mass.

International Publication WO 03/044324 discloses a fastening element including an anchor tube that forms the anchor element and has a receiving chamber for a hardenable mass and in which, in the region adjacent to the borehole bottom, a mixing element is provided. The fastening element is driven in the preliminary formed borehole and then the hardenable mass stored in the receiving chamber of the anchor tube is delivered through the mixing element. The components of the hardenable mass are mixed up in the space surrounding the anchor tube before the hardenable mass is brought out.

In order to reduce expenses associated with setting of a fastening element of the type discussed above, U.S. Pat. No. 4,055,051 discloses a so-called self-drilling rock anchor, e.g., for reinforcing tunnels and mines. The fastening element is driven in with a power drill in the wall or roof of a tunnel or mine. After a desired anchoring depth of the fastening element has been reached, the drilling process stops and the hardenable mass is forced out, e.g., with a piston that applies pressure to the mass, from the receiving chamber of the anchor tube through the inlet opening and the through-opening into the space surrounding the anchor tube. After the hardenable mass hardens, the fastening element is reliably anchored in the rock material.

The drawback of the fastening element of the U.S. Pat. No. 4,055,051 consists in that the hardenable mass that exits through the through-opening is intermixed only slightly. For an optimal anchoring of the fastening element, with multi-component masses, the slight intermixing of the components is often not sufficient.

German Patent Publication DE 103 01 968 A1 discloses a fastening element of the type discussed above in which a mixing element, which is displaceable into the drilling head, is provided in the receiving chamber. This fastening element, because of a simple setting process and a high quality of the produced anchorage, proved itself as a self-drilling rock anchor. However, for perfect functioning, the displaceable mixing element should have a corresponding shape of guide surfaces and/or the mixing element itself should have an appropriate shape.

Accordingly, an object of the present invention is fastening element having an anchor tube and a drilling head and which can be simply produced.

Another object of the present invention is to provide a fastening element of the type discussed above and which is capable of being driven in, using different setting processes.

SUMMARY OF THE INVENTION

These and other objects of the present invention, which will become apparent hereinafter, are achieved by providing, in the fastening element, a mixing element for the hardenable mass and which is located in the drilling head between the at least one inlet opening and the at least one through-opening.

With the drilling head of the inventive fastening element, different setting processes, using the inventive fastening element, can be implemented. The inventive fastening element is easy to produce as no mechanical measures must be implemented in the fastening element in order to insure a satisfactory intermixing of the hardenable mass.

Advantageously, the fastening element includes an inner tube located in the anchor tube and in which the hardenable mass is located. The hardenable mass, e.g., is stored in a foil bag that is pushed into the inner tube. During the drilling process, rinsing water can be fed to the drilling head through the space between the inner tube and the anchor tube. After the drilling process has been finished, the hardenable mass, which is located in the inner tube, is forced out, e.g., with a piston that applies pressure thereto. The hardenable mass is intermixed in the mixing element and exits, in the intermixed condition, into space between the anchor tube and the borehole wall. After hardening of the hardenable mass, the fastening element is reliably anchored.

The hardenable mass can also be fed from outside after the drilling process has ended. The fastening element is drilled in the rock or a constructional component, with the rinsing water being fed to the drilling head through the anchor tube. After the end of the drilling process, the hardenable mass is brought through the anchor tube, i.e., is pumped in. Before exiting of the hardenable mass into the space surrounding the anchor tube, the hardenable mass is mixed in the mixing element located in the drilling head.

The fastening element can be simply and cost-effectively produced and can be used in different setting processes. The simple design of the fastening element permits to prevent assemblage error. For different constructional components or rock materials, different drilling heads can be provided on the anchor tube. This adaptation of the fastening element can be easily effected by the user because the danger of malfunction of the fastening element after replacement of the drilling head can be substantially excluded.

Advantageously, the mixing element is formed as a static mixer. A static mixer insured good intermixing, in particular, of multi-component hardenable masses. The static mixer advantageously is formed of a plastic material. It is further advantageous that the static mixer has several inner walls which are correspondingly arranged relative to each other for an adequate intermixing of the components of the hardenable mass and form a mixing path for the hardenable mass.

Advantageously, the mixing element is clampingly retained in the drilling head. The mixing element can have, e.g., at least in some regions, an excessive size relative to the receptacle for the mixing element provided in the drilling head. Therefore, during mounting of the mixing element, it is held in the drilling head without a possibility of being lost. Alternatively, the mixing element is glued in the receptacle, which is provided in the drilling head, at least in some regions. The fixation of the mixing element in the drilling head advantageously is so effected that, simultaneously, a circumferential sealing of the mixing element in the drilling head receptacle is provided.

Advantageously, a stop for the mixing element is provided between the mixing element and the at least one through-opening. The stop prevents mixing element, when the mixing element is displaced by the hardenable mass to which pressure is applied, from being displaced so far in the drilling head that it would close the at least one through-opening, so that a sufficient amount of the hardenable mass would not be able to exit the anchor tube for a satisfactory anchoring of the anchor tube in the constructional component.

Advantageously, the stop is formed as a plate-shaped member having at least one through-opening for the hardenable mass. The plate-shaped form of the stop provide an adequate stop surface for the mixing element for reliably limiting the displacement of the mixing element in the direction of the at least one through-opening. In addition, the mixing element, in particular when formed of a plastic material, could not be so deformed that it would slide over the stop in the drilling head upon application of high pressure to the hardenable mass.

Advantageously, the drilling head has a circumferential bead sealingly engageable with the second end of the anchor tube. Because the fastening element, during the ejection process, is supported against the borehole bottom by the drilling head, a satisfactory sealing of the contact surface between the drilling head and the end of the anchor tube is insured. The produced sealing prevents a sidewise exit of the hardenable mass, without affecting the flow of the hardenable mass through the mixing element. According to an advantageous embodiment of the invention, an additional sealing element, e.g., in form of a sealing ring, is provided on the head.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 1 a side, partially cross-sectional view of a fastening element according to the present invention; and FIG. 2 a cross-sectional view of a drilling head of the fastening element according to marking II in FIG. 1.

DETAILED DESCRIPTION OF THE PREFERRED EMBODIMENT

A fastening element 11 according to the present invention, which is shown in FIGS. 1-2, includes an anchor tube 12 having a receiving chamber 13 for a hardenable mass. At first end 14 of the anchor tube 12, there is provided rotation transmitting means 15 in form of a polygon for a power drill, not shown. At a second end 16 of the anchor tube 12 opposite the first end 14, there is provided a drilling head 21. In the receiving chamber 13 of the anchor tube 12, there is arranged an inner tube 17 that serves as a receptacle for the hardenable mass.

The drilling head 21 has a drilling bit 22, an inlet opening 23 that opens toward the receiving chamber 13, and two through-openings 24 that open outwardly for passing the hardenable mass therethrough. In the drilling head 21, between the inlet opening 23 and the through-openings 24, there is provided a static mixer for the hardenable mass in form of a mixing element 31. The mixing element 31 is clampingly retained in the drilling head 21. Between the mixing element 31 and the through-openings 24, there is provide a plate-shaped stop 25 for the mixing member 31. The plate-shaped stop 25 has a through-opening 26 for the hardenable mass. The drilling head 21 further has a circumferential bead 27. The bead 27 can be brought in abutment with the second end 16 of the anchor tube 12 and serves as a stop for the drilling head 21.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A fastening element, comprising an anchor tube (12) having a receiving chamber (13) for a hardenable mass; a drilling head (21) provided at one end (16) of the anchor tube (12) and having at least one inlet opening (23) that opens toward the receiving chamber (13) of the anchor tube (12), and at least one through-opening (24) that opens outwardly for passing of the hardenable mass therethrough; and a mixing element (31) for the hardenable mass and located completely in the drilling head (21) between the at least one inlet opening (23) and the at least one through-opening (24).

2. A fastening element according to claim 1, wherein the mixing element (31) is formed as a static mixer.

3. A fastening element according to claim 1, wherein the mixing element (31) is clampingly received in the drilling head (21).

4. A fastening element according to claim 1, further comprising a stop (25) for the mixing element (31) and which is located between the at least one through-opening and the mixing element (31).

5. A fastening element according to claim 4, wherein the stop (25) is formed as a plate-shaped member having at least one through-opening (26) for the hardenable mass.

6. A fastening element according to claim 1, wherein the drilling head (21) has a circumferential bead (27) sealingly engageable with the second end (16) of the anchor tube (12).

* * * * *